(12) United States Patent
Paivike et al.

(10) Patent No.: US 6,327,256 B1
(45) Date of Patent: Dec. 4, 2001

(54) APPARATUS, AND ASSOCIATED METHOD, FOR COMMUNICATING PACKET DATA IN A RADIO COMMUNICATION SYSTEM

(75) Inventors: Heikki Paivike, Coppell, TX (US); Risto Paatelma, Kaijonharju Oulu (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/322,476

(22) Filed: May 28, 1999

(51) Int. Cl.$^7$ ........................................... H04J 3/16
(52) U.S. Cl. ................................................. 370/337
(58) Field of Search ..................... 370/441, 442, 370/337, 461, 462, 480, 395, 389, 351, 465, 444, 445, 249, 347, 350, 458, 459; 455/421, 422, 509, 510, 516, 520

(56) References Cited

U.S. PATENT DOCUMENTS 5,881,050 * 3/1999 Chevalier et al. ................ 370/230
6,038,212 * 3/2000 Galand et al. .................... 370/256

* cited by examiner

*Primary Examiner*—Dang Ton
(74) *Attorney, Agent, or Firm*—Brooke Hayes (57) ABSTRACT

Apparatus, and an associated method, by which to transmit packet data from a mobile station to network infrastructure of a TDMA, cellular communication system at an increased rate. The increased rate is provided while still operating the mobile station in half-duplex mode of operation. In one implementation, the mobile station is operable to effectuate triple-rate communication of packet data at a multi-rate defined in the GPRS-136 standard.

21 Claims, 5 Drawing Sheets

APPARATUS, AND ASSOCIATED METHOD, FOR COMMUNICATING PACKET DATA IN A RADIO COMMUNICATION SYSTEM

The present invention relates generally to the communication of packet data in a communication system, such as a TIA/EIA-136 cellular communication system which provides GPRS (General Packet Radio Service). More particularly, the present invention relates to apparatus, and an associated method, for communicating packet data between a mobile station and a radio base station of the network infrastructure of the communication system. A signaling scheme is provided which permits packet data to be transmitted at increased bit rates without requiring the mobile station to be operated in a full-duplex mode.

BACKGROUND OF THE INVENTION

Advancements in communication technologies have permitted the introduction of, and popularization of, new types of communication systems. As a result of such advancements, the rate of data transmission, and corresponding amount of data, permitted to be communicated in such communication systems, has increased.

A radio communication system is representative of a type of communication system which has benefited from advancements in communication technologies. A radio communication system inherently increases communication mobility as communication channels defined in such a system are formed of radio channels and do not require wireline connections for their formation. A radio communication system, however, typically is bandwidth-limited. That is to say, regulatory bodies which allocate usage of the electromagnetic spectrum allocate only a limited amount of the electromagnetic spectrum for communications in a particular radio communication system. Because the spectrum allocation for use by a particular system is limited, communication capacity increase of a radio communication system is limited by such allocation. Increase of the communication capacity of the radio communication system, therefore, is typically only possible if the efficiency by which the allocated spectrum is used is increased.

Digital communication techniques, for instance, provide a manner by which to increase the bandwidth efficiency of communications in a communication system. The use of digital communication techniques are particularly advantageously implemented in radio communication systems due to the particular need to efficiently utilize the spectrum allocated to such systems.

A cellular communication system is exemplary of a radio communication system. Cellular communication systems make relatively efficient use of the spectrum allocated thereto. Signals generated during operation of the cellular communication system are of relatively low power levels. Because of the use of low-power signals, the same channels can be reused throughout a cellular communication system according to a cell reuse plan. Concurrent use of the same channels is permitted according to the cell reuse plan, thereby to effectuate different and concurrent communications on the same channels at different locations throughout the area encompassed by the cellular communication system.

However, even with the relatively efficient utilization of the allocated spectrum, many cellular communication systems have been operated at their maximum capacities, particularly at certain times-of-day and within certain cells of the cellular communication system. Digital communication techniques have advantageously been utilized in cellular communication systems to increase the communication capacities of such systems. Increased communication capacity of both voice and non-voice information is generally provided as a result of use of such digital communication techniques.

When information is digitized pursuant to a digital communication technique, the digitized information can be formatted into packets of data to be transmitted in packet form as discrete packets. When information is communicated in the form of packets of data, a dedicated channel need not necessarily be allocated for the transmission of the data. Instead, a channel can be shared, used by a plurality of mobile stations.

GPRS (General Packet Radio Service) communications for a GSM (Global System for Mobile communications) is a packet data service which shall be available to subscribers of some GSM systems. Standard specifications promulgated by ETSI pertaining to GPRS communications define the communication protocols for communicating packet data in such a system.

Both real-time and non-real-time communications can be effectuated utilizing packet data transmissions, such as those provided pursuant to GPRS. When real-time data is communicated, the manner, e.g., the rate in which the packets of data are communicated is required to be controlled to ensure that the packets of data are transmitted in a manner to permit their delivery in a timely manner at a destination.

The standard relating to GPRS communications, for instance, sets forth a mode of operation and a signaling protocol between a mobile station and the network infrastructure pursuant to which the GPRS communications are effectuated. A mobile station, for instance, transmits packets of data during packet data communication operations according, and responsive, to such protocol. The ETSI GSM specifications define how the GPRS packets are transferred over the GSM radio interface between a mobile station and a base station. The ETSI GSM standards also define the GPRS network elements, interfaces between network elements, signaling procedures, and data transfer procedures between the mobile station and the network.

The GPRS services will be provided also in TIA/EIA-136 mobile communication networks. The GPRS over TIA/EIA-136 has been named GPRS-136. GPRS-136 is being standardized in TIA. The GPRS-136 will differ from the GSM GPRS mainly in the radio interface part. It is necessary to define in the TIA/EIA-136 standards how the GPRS data packets will be transferred over the TIA/EIA-136 radio interface. This radio interface differs from the GSM radio interface in for instance bandwidth and frame structure. Most other aspects, except the radio interface, will be the same in GPRS-136 as in GSM GPRS. This means mainly that the ETSI GSM specifications will define the signaling procedures, data transfer procedures and the network elements and interfaces also in GPRS-136. From the user point of view many of the same services will be available as in GSM GPRS.

The proposed standards pertaining to uplink transmissions, i.e., packet data communicated by a mobile station to the network infrastructure, contained in an existing GPRS-136 draft standard does not, however, provide for significant bit rate increases in uplink double and triple rate relative to full rate of operation. A significant problem which limits the bit rate increase in the double-rate and triple-rate modes of operation is due to the existing requirement that the same sub-channel be used for both the uplink transmission of packet data and downlink acknowledgment of receipt of each packet of data. Namely, a PCF sub-channel is utilized by the network infrastructure to transmit acknowledgment indications responsive to receipt, at the network infrastructure, of GPRS 136 MAC PDUs on the same sub-channel. Such PCF sub-channel is also utilized by the network infrastructure to allocate uplink time-slots to the mobile station to communicate the packets of data thereon.

In other words, in the existing draft standard, a mobile station is required both to receive and to transmit upon the same sub-channel. But operation of the mobile station at a double or triple-rate of operation, would require full-duplex operation of the mobile station. Full-duplex operation would require more complex and costly implementation of the radio frequency circuitry of the mobile terminal.

A manner by which to permit double- or triple-rate communication of the packet data while permitting the mobile station to operate in a half-duplex mode would therefore be advantageous.

It is in light of this background information related to the communication of packet data that the significant improvements of the present invention have evolved.

SUMMARY OF THE INVENTION

The present invention, accordingly, advantageously provides apparatus, and an associated method, for communicating packet data at a desired rate.

In one implementation, double- and triple-rate half-duplex modes of packet data transmission are provided for a GPRS-136 standard proposal which defines operational standards of packet data communications provided in the TIA/EIA-136 system.

Improved bit rates of data transmission are provided through operation of an embodiment of the present invention without requiring a mobile station to be operated in a full-duplex mode. Bit transmission rates of packet data communicated by a mobile station to the network infrastructure is provided at the same level as triple-rate, full-duplex operation but without requiring full-duplex operation of the mobile station. The need otherwise to provide channels for implementing full-duplex operation of the mobile station is obviated.

In one aspect of the present invention, when packet data is to be communicated by a mobile station to the network infrastructure of a cellular communication system, a request is first made by the mobile station to the network infrastructure for allocation to the mobile station for a fixed allocation of communication capacity to communicate an unbounded size transaction of packet data. The request also indicates the mobile station to be multi-rate half-duplex capable. Responsive to detection at the network infrastructure of the request, a determination is made whether to grant to the mobile station the communication resources to permit the communication of the packet data at a selected transmission rate. That is to say, the request for the fixed allocation is of a level to permit the communication of packet data at a selected multirate, such as a double-rate or a triple-rate. If a determination is made at the network infrastructure to grant to the mobile station communication capacity to effectuate the communication of the packet data at the selected rate, the network infrastructure grants to the mobile station communication resources by way of a downlink transmission to the mobile station. The grant is for a fixed allocation of a plurality of successive time-slots.

In a specific implementation of the GPRS-136 draft standard for a TIA/EIA-136 cellular communication system, when the mobile station is to communicate packet data to the network infrastructure, the request is made as part of an uplink BEGIN PDU (Packet Data Unit). In particular, the request forms a portion of a BP (Bandwidth Preference) field of the PDU. The request includes an indication that the mobile station is capable of operation in a multirate, e.g., half-duplex, triple-, or full-rate mode, and further includes a request for an unbounded size transaction and usage of fixed allocation. Once the request is received at the network infrastructure, acknowledgment of the BEGIN request is returned to the mobile station by way of downlink ARQ status PDU (Protocol Data Unit). As part of the ARQ status PDU, the network infrastructure provides to the mobile station a grant of an allocation of time-slots within which the packets of data are to be communicated by the mobile station.

In one implementation, the allocation commences from the first occurrence on the uplink of the sub-channel on which the mobile station receives the ARQ status PDU.

The mobile station inserts CONTINUE PDUs in successive uplink time-slots to indicate to the network infrastructure that the transaction formed of the packet data is not yet complete. When a transaction is near completion by the mobile station, the mobile station sends a CONTINUE PDU with an END block indicating the BSN (Block Sequence Number) of the last data block. The base station acknowledges all CONTINUE PDUs by sending ARQ status PDU(s) after the end of the fixed allocation as a response to the mobile setting the PI (Poll Indication) bit in the last CONTINUE PDU.

Thereby, when the mobile station is to be operated in a multi-rate, e.g., double- or triple-rate mode of operation, by requesting allocation of the fixed allocation of time-slots to effectuate the communication at the selected bit rate, and subsequent grant of allocation thereto by the network infrastructure, half-duplex operation of the mobile station can commence. Packets of data are inserted into time-slots allocated thereto and the packets of data are transmitted by the mobile station to the network infrastructure. The desired bit transmission rate is provided without the need to operate the mobile station in a full-duplex mode which otherwise would require more complex and costly mobile terminal implementation. Also, because the grant is for a plurality of time-slots, separate grants need not be generated to grant the mobile station permission to transmit packet data during each time-slot. The base station acknowledges all CONTINUE PDUs with ARQ status PDUs at the end of the fixed allocation. This removes the necessity to use the PCF subchannel for individual acknowledgments.

In these and other aspects, therefore, apparatus, and an associated method, is provided for facilitating communication of packet data upon time-slots defined upon a communication channel formed between a first communication station and a second communication station. A fixed allocation requester is coupled to receive indications of when the packet data is to be communicated to the second communication station. The fixed allocation requester indicates the first communication station to be fixed allocation capable and requests allocation of a fixed sequence of successive time-slots defined upon the communication channel. The successive time-slots of the fixed sequence of which the allocation is requested, defines a transmission rate at which the packets of data are to be communicated upon the communication channel to the second communication station. An allocation grant detector is coupled to receive indications of a grant of the fixed sequence of the successive time-slots received at the first communication station. The allocation granted the detector detects when the fixed sequence of the successive time-slots are allocated to the first communication station to communicate the packet data thereon. The grant encompasses a plurality of time-slots. A formatter is operable to detection by the allocation grant detector of the allocation of the fixed sequence of the successive time-slots to communicate the packet data thereon. The formatter formats the packet data within the time-slots of the fixed sequence of the successive time-slots allocated to the first communication station.

A more complete appreciation of the present invention and the scope thereof can be obtained from the accompanying drawings which are briefly summarized below, the following detailed description of the presently preferred embodiments of the invention, and the appended claims.

DETAILED DESCRIPTION

Figure 1:
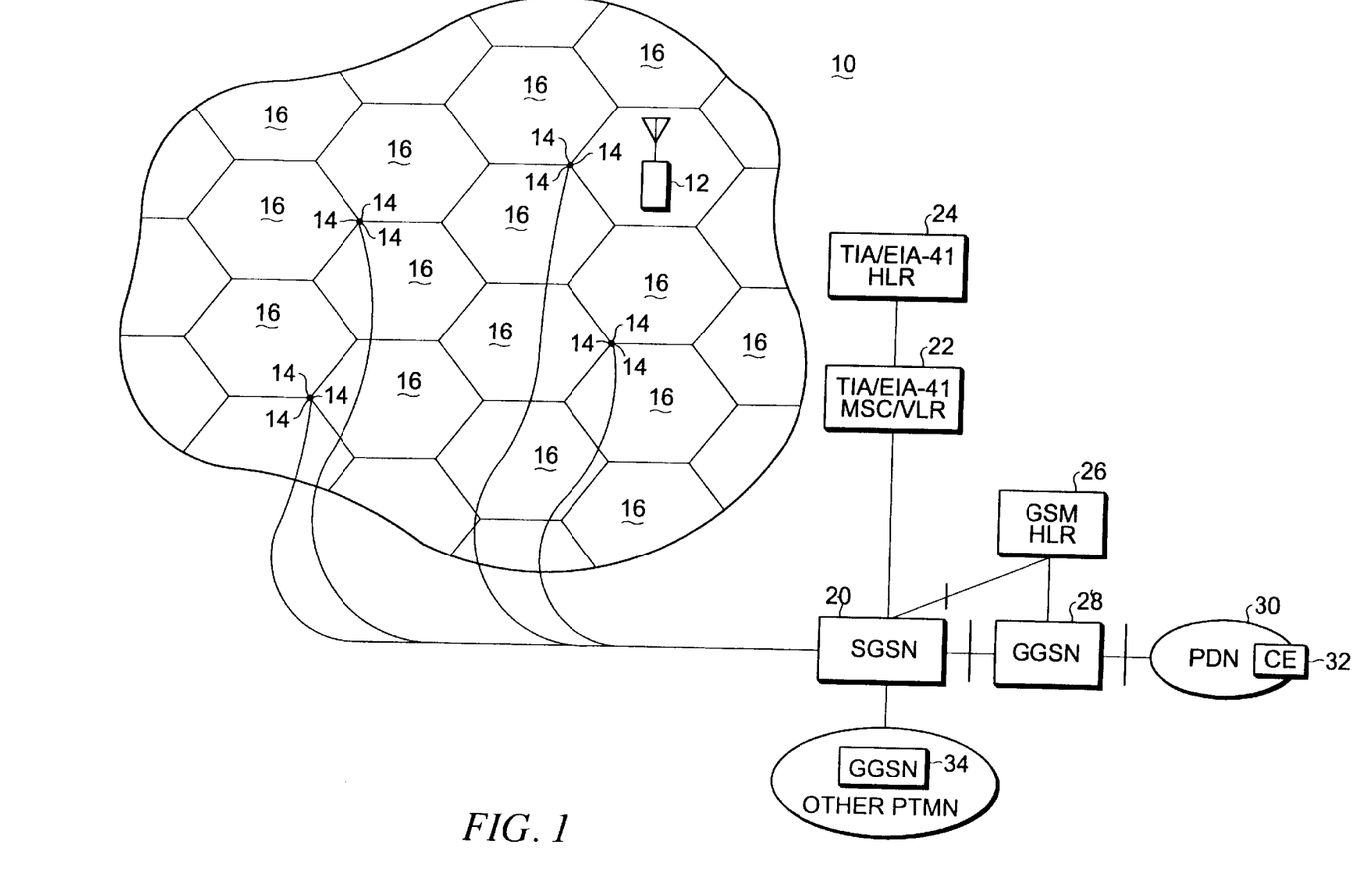
FIG. 1 illustrates a functional block diagram of a portion of a radio communication system in which an embodiment of the present invention is operable.

Turning first to FIG. 1, a radio communication system, shown generally at 10, is operable at least to communicate packet data between a mobile station 12 and network infrastructure of the communication system. In the exemplary implementation shown in the Figure, the communication system 10 comprises an EIA/TIA-136 cellular communication system which provides GPRS (General Packet Radio Service), such as that defined in a GPRS-136 standard promulgated by the TIA, 136-330 draft standard. The elements in the Figure pertain to packet communications. While operation of an embodiment of the present invention shall be described with respect to such cellular communication system, in other implementations, other embodiments of the present invention are analogously operable in other communication systems to communicate packet data between a sending station and a receiving station.

The network infrastructure of the cellular communication system 10 includes a plurality of spaced-apart radio base stations 14 positioned at spaced intervals throughout the geographical area encompassed by the communication system. The radio base stations 14 are fixed-site radio transceivers capable of multi-user communications. In the exemplary implementation shown in the Figure, groups of three radio base stations 14 are co-located. Each radio base station 14 forms a sector cell 16. For purposes of illustration, the cells 16 are represented to be hexagonal in configuration.

Groups of the radio base stations 14 are coupled to an SGSN (Serving GPRS Service Node) 20. The SGSN 20 is coupled to a TIA/EIA-41 MSC/VLR (Mobile Switching Center/Visitor Location Register) 22. And, in turn, the MSCO/VLR 22 is coupled to a TIA/EIA-41 HLR (Home Location Register) 24.

The SGSN 20 is further coupled to a GSM HLR 26 and to a GGSN (Gateway GPRS Service Node) 28. The GGSN is coupled to a PDN 30 (Packet Date Network) to which a correspondent entity 32 is also coupled.

The SGSN 20 is further coupled to a GGSN 34 which is coupled to another PLMN (Public Land Mobile Network).

During operation of the communication system, packet data is communicated between the mobile terminal 12 and a correspondent entity, such as the correspondent entity 32. Packet data communicated therebetween is routed over a radio link extending between the mobile station a base station 14 through the nodes 20 and 28, and through the packet data network 30. Communication of packet data analogously can be effectuated between a mobile station 12 and another correspondent entity, such as a correspondent entity coupled to the PLMN 36.

The aforementioned GPRS-136 standard for TIA/EIA-136 sets forth a radio air interface standard defining protocols of operation for communicating the packets of data from the mobile station 12 to the radio base station 14 to perform GPRS in the TIA/EIA-136 system. Such standard sets forth, amongst other things, signaling protocols by which the mobile station requests, and is granted, communication resources to effectuate the communication of packet data from the mobile station to the radio base station, thereafter to be routed therefrom.

Existing proposals define the protocols by which the mobile station requests, and the network infrastructure grants, communication resources for the communication of the packets of data. A standard rate at which the packets are transmitted is defined in which packets of data communicated by the mobile station are transmitted on the same uplink subchannel that carries to the downlink PFC (Packet Channel Feedback) indicating acknowledgments and reservations to the mobile. Proposals have been set forth to increase the rate at which the packets of data are transmitted by the mobile station. For instance, double rate and triple rate modes of operation of the mobile station have been proposed. However, utilizing existing protocols, double- and triple-rate operation cannot be effectuated in conventional manner with a conventional signaling scheme without operating the mobile station in a full-duplex mode. An embodiment of the present invention provides a manner by which to permit the mobile station to transmit at multi-rates, e.g., the double or triple-rates, while operating the mobile station in a half-duplex mode.

Figure 2:
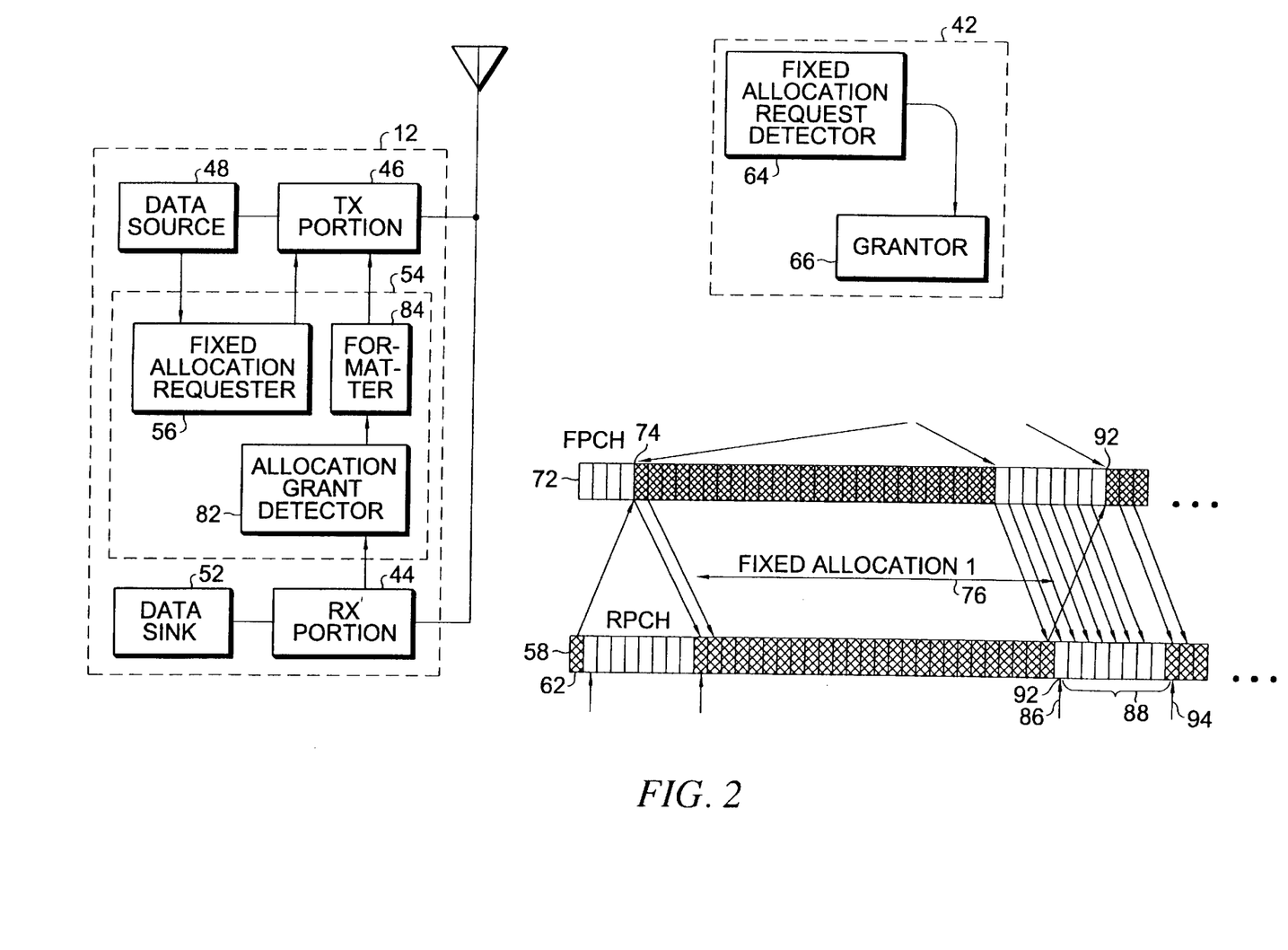
FIG. 2 illustrates a functional block diagram of elements of the mobile station and network infrastructure, shown in FIG. 1, operable pursuant to an embodiment of the present invention, and portions of forward and reverse channels showing the protocol scheme by which signaling between the mobile station and the network infrastructure is effectuated at the commencement of a fixed allocation transaction.

FIG. 2 illustrates the mobile station 12 and a portion of the network infrastructure, each operable pursuant to an embodiment of the present invention. The portion of the network infrastructure is here identified as a logical element, a FA (Fixed Allocation) manager 42. The logical element is located, e.g., at any of the elements shown in FIG. 1 to form the network infrastructure of the cellular communication system 10, or distributed amongst more than one element.

The mobile station 12 is here shown to include a receive portion 44 and a transmit portion 46 operable to receive and to transmit radio signals, respectively. A data source 48 sources packet data which is transmitted by the transmitter portion 46. And, a data sink 52 is coupled to the receiver portion 44.

The mobile station 12 further includes a controller 54 operable to control operation of the mobile station. The controller 54 is here shown to include a functional element forming a fixed allocation requester 56. The requester 56 is coupled to receive indications when packet data sourced by the data 48 is to be communicated by the mobile station. Responsive to such indications, the requester 56 causes generation of a request for transmission to the FA manager 42 for a fixed allocation of successive time-slots upon a reverse packet channel to effectuate transmission of packets of data at a selected transmission rate. The request includes an indication of multi-rate capability of the mobile station.

A representative portion of a reverse paging channel 58 is also shown in the Figure. The fixed allocation requester requests the fixed allocation, in a BP field of an uplink BEGIN PDU, indicated as section 62 of the portion of the reverse channel 58.

The FA manager 42 is here shown to include a functional element forming a fixed allocation request detector 64. The fixed allocation request detector detects the request for the fixed allocation of successive time-slots generated by the mobile station 12 and here transmitted in the BP field 62. Indications of detections made by the detector 64 are provided to a grantor 66.

The grantor is operable responsive to detection by the detector 64 of the indications of the request contained in the field 62 of the paging channel 58. The grantor 66 is operable first to acknowledge the BEGIN PDU detected by the detector 64 indicated by the status indication defined upon a forward paging channel 72. An ARQ status PDU (Packet Data Unit) 74 is defined upon the paging channel 72.

The grantor 66 is further operable to selectively grant to the mobile station 12 a fixed allocation of a selected number of time-slots for the mobile station to communicate packet data on the reverse channel 58. If the grantor 66 determines not to grant to the mobile station such a fixed allocation, the grantor is operable to require the mobile station 12 to operate in conventional reserve access mode.

The ARQ status PDU 74 includes a field that indicates the fixed allocation and the number of time-slots allocated by the grantor for the mobile station to communicate the packet data thereon. The allocation commences from the first occurrence of a corresponding uplink sub-channel on which the mobile station received the ARQ status PDU 74. Here, the fixed allocation is indicated by the line segment 76. That is to say, the time-slots on the reverse channel falling within the length of the line segment 76 are the time-slots of the fixed allocation to the mobile station. The PCF (packet channel feedback) sub-channel of the time-slot that contains the ARQ status indicates allocation of this sub-channel to the mobile station. During the fixed allocation, an SA field of the PCF on all downlink slots indicates allocation to the mobile station.

The controller 54 of the mobile station 12 further includes a functional element forming an allocation grant detector 82 coupled to receive indications of the portion 74 of the forward channel 72 which contains the ARQ status PDU. And, the controller 54, further includes a functional element forming a formatter 84 operable responsive to detection by the allocation grant detector 82 of the grant of the fixed allocation of time-slots to the mobile station. The formatter 84 is operable to cause formatting within the time-slots of the fixed allocation of time-slots of the packet data for communication from the mobile station 12 to the network infrastructure.

The formatter 84, pursuant to its formatting operations, also inserts CONTINUE PDUs in the successive uplink time-slots allocated pursuant to the grant. That is to say, in each of the time-slots of the reverse channel of the fixed allocation, indicated by the line segment 76, a CONTINUE PDU is inserted. Such CONTINUE PDUs, when received at the FA manager 42, indicate that the transaction, i.e., transmission of the packet data, is to continue and is not yet completed. In one implementation, the CONTINUE PDU includes a PI (packet indicator) bit. The PI bit is set in any selected CONTINUE PDU to initiate an ARQ status to be returned by the network infrastructure. Such operation permits recovery from a "stalled TX window" situation and also permits more efficient use of the packet channel than waiting for termination of the fixed allocation to take additional action. Setting the PI bit indicates a request to end fixed allocation. When the BS notices the PI bit, it sends an ARQ status to the mobile.

As indicated at the time-slot location 86 of the portion 58 of the reverse channel shown in the Figure, the quota of time-slots granted to the mobile station finishes, and, in subsequent time-slots indicated by the time-slots 88 the FA manager schedules uplink time-slots to another mobile station.

The time-slot indicated at the location 92 of the portion of the reverse channel 72 indicates the quota of time-slots granted to the mobile station 12 within the allocation indicated by the line segment is complete, and the mobile station 12 stops transmitting packet data, and instead, commences receive operations. Subsequent to the time-slots 88, the FA manager sends another ARQ status format 2 PDU to the mobile station. This ARQ status includes a bit map within the field 92.

If another fixed allocation is to be granted to the mobile station 12 by the grantor 66, the subsequent fixed allocation link forms a portion of the field 92 of the ARQ status format to PDU. Additional fixed allocations are necessitated if the transaction requires the allocation of additional time-slots to complete the transaction. Again, the grant issued by the network infrastructure is for a plurality of successive time-slots.

At the time indicated at location 94, the allocation grant detector 78 detects the ARQ status format 2 PDU. Responsive thereto, the formatter 84 is caused to format additional packets of data into the time-slots allocated to the mobile station.

Figure 3:
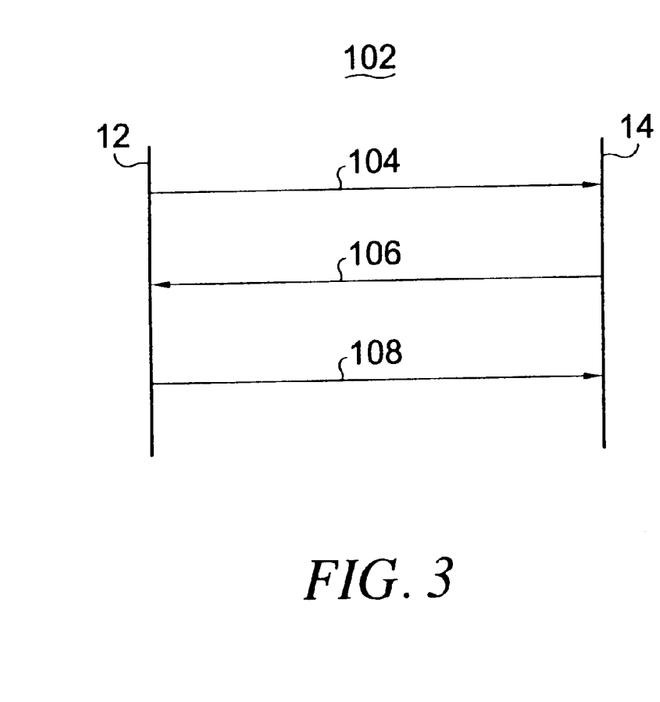
FIG. 3 illustrates a sequence diagram of the signaling between the mobile station and the network infrastructure during the commencement of a fixed allocation transaction.

FIG. 3 illustrates a sequence diagram, shown generally at 102, representative of the procedure by which the mobile station requests, and the FA manager 42 allocates, a fixed allocation of successive time-slots upon which the mobile station transmits packets of data to effectuate multi-rate, e.g., double- or triple-rate, operation of the mobile station.

First, and as indicated by the sequence segment 104, the mobile station requests a fixed allocation of time-slots to effectuate an unbounded size transaction. In the aforementioned GPRS-136 system, such a request is contained in the BP field of an uplink BEGIN PDU indicating to the network infrastructure that the mobile station is multi-rate capable. The request also requests a fixed allocation of time-slots to effectuate a transaction of an unbounded size.

Responsive to the request, the network infrastructure determines whether to grant the fixed allocation. When a grant of a fixed allocation of time-slots is to be made to the mobile station, the network infrastructure generates a downlink ARQ status 1 PDU, indicated by the sequence segment 106. The PDU acknowledges to the mobile station receipt of the uplink PDU 104 and also includes a field indicating the fixed allocation and the number of time-slots allocated to the mobile station.

Then, and as indicated by the sequence segment 108, packets of data are transmitted by the mobile station. During each time-slot of the fixed allocation, if a subsequent time-slot is to be used to continue a transaction prior to its completion, a CONTINUE PDU is inserted into the time-slot. The CONTINUE PDU indicates to the network infrastructure of non-completion of a particular transaction. Successive fixed allocation requests and grants are utilized until a transaction is completed.

Figure 4:
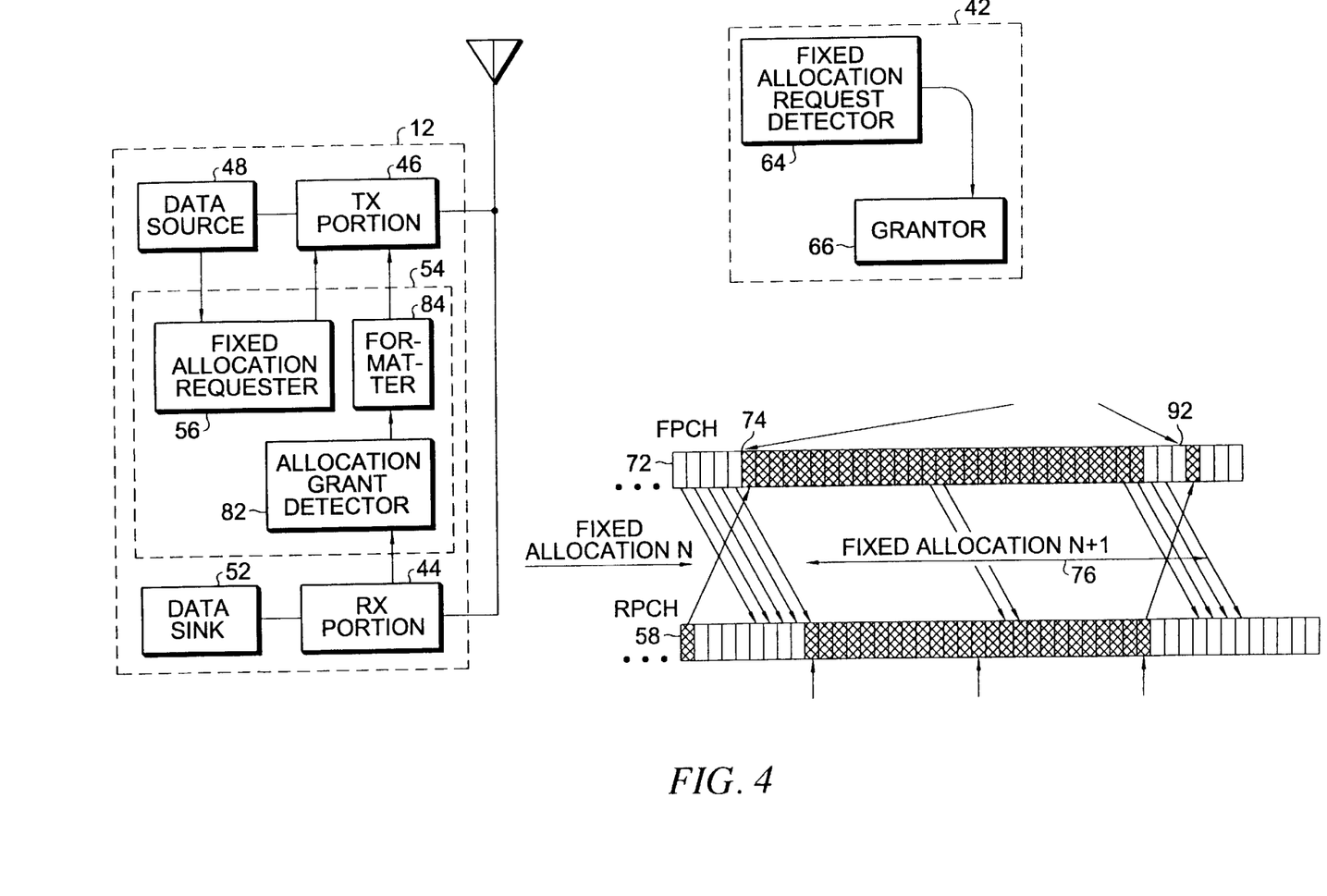
FIG. 4 illustrates a functional block diagram, similar to that shown in FIG. 2, but here illustrating the protocol scheme by which signaling between the mobile station and the network infrastructure is effectuated at the end of a fixed allocation transaction.

FIG. 4 again illustrates the mobile station 12 and the FA manager 42, shown previously in FIG. 2. The various elements of the mobile station and of the FA manager correspond to commonly-referenced elements shown in FIG. 2. The operation of such elements is as above-described, and shall not be described again. FIG. 4 illustrates operation of the mobile station and the FA manager at the end of a fixed allocation transaction. Portions of the reverse paging channel and the forward channel 72 are again also shown in the Figure.

Here, subsequent to a request for a fixed allocation by the mobile station, shown in FIGS. 2–3, the grantor 66 of the FA manager 42 grants to the mobile station 12 a fixed allocation of time-slots. Again, the grant is provided to the mobile station in the form of a downlink ARQ status format 1 PDU 74 of the forward channel 72. Responsive thereto, the detector 78 of the mobile station detects the values contained in the field and causes formatter 84 to format the packets of data into the allocated time-slots to be communicated on the reverse packet channel during the allocated time-slots. And, formatter 84 again causes insertion of a CONTINUE PDU into the time-slots prior to completion of the transaction.

When a determination is made at the mobile station that the transaction is approaching completion, such as at the last data block of the transaction, the formatter 84 inserts a CONTINUE PDU with an END BLOCK indicating the BSN of the last data block. The final data block of the transaction is transmitted by the mobile station on the reverse channel, the final data block having the BSN indicated in the END BLOCK thereof.

The network infrastructure receives the last data block of the transaction transmitted thereto by the mobile station. Responsive thereto, a downlink ARQ status format 2 PDU with a bit map is inserted into the field 74 of the forward channel and transmitted to the mobile station.

In the event that the fixed allocation time-slots allocated by the grantor 66 to the mobile station ends prior to completion of communication by the mobile station of all of the data blocks, completion of the transaction can be effectuated in conventional manner. That is to say, single-rate transmission is used in which the mobile station is allocated uplink time-slots one at a time to effectuate completion of the transaction. In the event the transaction is completed prior to the end of the fixed allocation of time-slots, indicated by detection of the END BLOCK indicative of completion of the transaction, the GPRS manager is able to reschedule remaining portions of the fixed allocation of PDUs to another mobile station.

Figure 5:
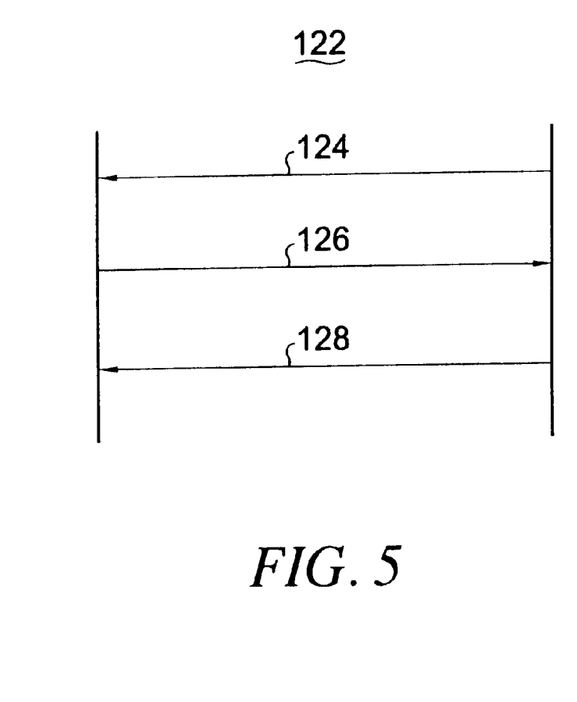
FIG. 5 illustrates a sequence diagram showing the sequencing between the mobile station and the network infrastructure at the end of a fixed allocation transaction during operation of an embodiment of the present invention.

FIG. 5 illustrates a sequence diagram, shown generally at 122, which illustrates operation of an embodiment of the present invention at the end of a fixed allocation transaction. When communication of a transaction formed of a plurality of packets of data from a mobile station to the network infrastructure is to be effectuated, requests are made by the mobile station for the allocation of successive time-slots upon which to communicate the packets of data. Subsequent to a request for the allocation of the time-slots, a grant is made by the network infrastructure, indicated by the sequence segment 124 which is communicated as a downlink ARQ status format 2 PDU. Detection is made at the mobile station of the PDU and uplink transmissions are generated, indicated by the sequence segment 126. An END portion of the transaction formed of the uplink transmissions of the packet data includes a CONTINUE PDU with an END BLOCK indicating the BSN of the final data block. Subsequent to communication of the last data block, the mobile station terminates its transmission and enters into a receive mode. Once the network infrastructure receives the last data block of the transaction, a downlink ARQ status format 2 PDU, indicated by the sequence segment 128, contains a bit map.

Operation of an embodiment of the present invention thereby provides a manner by which to operate the mobile station at double- or triple-transmission-rates in a half-duplex mode. Merely by including a BP field value in an uplink BEGIN PDU, otherwise defined in a GPRS-136 standard, defining a triple-rate half-duplex uplink, double- and triple-rates of transmission are achieved without requiring operation of the mobile station in a full-duplex mode.

Figure 6:
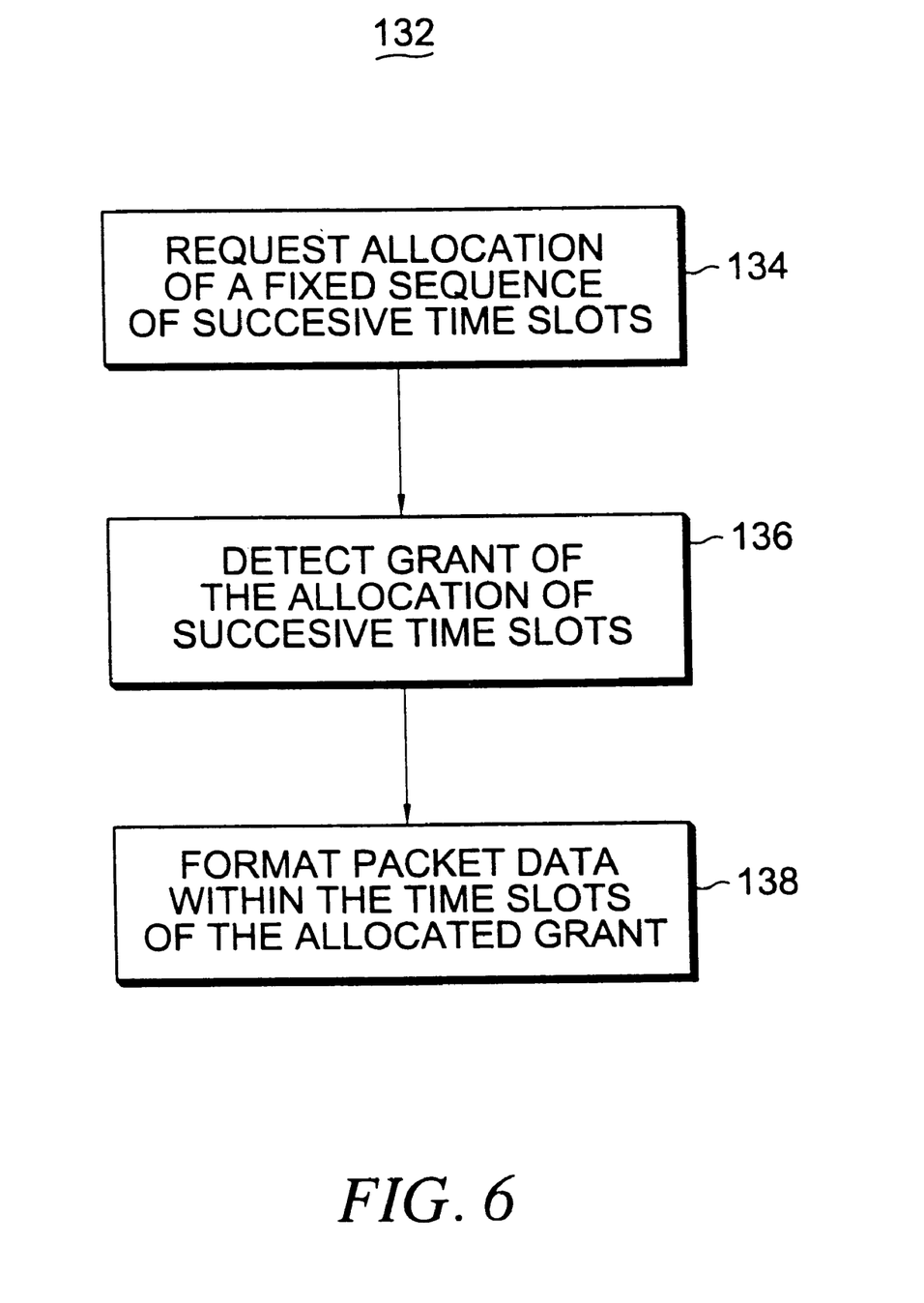
FIG. 6 illustrates a method flow diagram listing the method steps of the method of operation of an embodiment of the present invention.

FIG. 6 illustrates a method flow diagram, shown generally at 132, listing the method steps of the method of operation of an embodiment of the present invention. The method facilitates communication of packet data upon time-slots defined upon a communication channel formed to extend between a first communication station and a second communication station.

First, and as indicated by the block 134, a request is made by the first communication station for allocation of a fixed sequence of successive time-slots to communicate the packet data from the first communication station to the second communication station. The successive time-slots of the fixed sequence define a transmission rate at which the packets of data are to be communicated upon the communication channel.

Then, and as indicated by the block 136, detection is made at the first communication station of when the request for the allocation of the fixed sequence is granted. And, as indicated by the 138, the packet data is formatted within the time-slots of the fixed sequence of the successive time-slots. Thereafter, the packets of data are transmitted from the first communication station to the second communication station.

The previous descriptions are of preferred examples for implementing the invention and the scope of the invention should not necessarily be limited by this description. The scope of the present invention is defined by the following claims:

We claim:

1. In a communication system in which a first communication station is operable at least to communicate packet data to a second communication station, an improvement of apparatus for the first communication station for facilitating communication of the packet data upon time-slots defined upon a communication channel formed between the first communication station and the second communication station, said apparatus comprising:

a fixed allocation requester coupled to receive indications of when the packet data is to be communicated to the second communication system, said fixed allocation requester for indicating the first communication station to be fixed allocation capable and for requesting allocation of a fixed sequence of successive time-slots defined upon the communication channel, the successive time-slots of the fixed sequence of which the allocation is requested defining a transmission rate at which the packets of data are to be communicated upon the communication channel to the second communication station;

an allocation grant detector coupled to receive indications of a grant of the fixed sequence of the successive time-slots received at the first communication station, the fixed sequence of the successive time-slots, and the grant encompassing the plurality of the successive time-slots said allocation grant detector for detecting when the fixed sequence of the successive time-slots are allocated to the first communication station to communicate the packet data thereon; and a formatter operable responsive to detection by said allocation grant detector of the allocation of the fixed sequence of the successive time-slots to communicate the packet data thereon, said formatter for formatting the packet data within the time-slots of the fixed sequence of the successive time-slots allocated to the first communication station.

2. The apparatus of claim 1 wherein the first communication station is selectively operable to communicate the packet data at a more-than-full rate and wherein the fixed sequence of successive time-slots requested by said fixed allocation requester is of a number to permit effectuation of communication of the packet data at the more-than-full rate.

3. The apparatus of claim 2 wherein said fixed allocation requester further requests permission to transmit packet data of an unbounded transaction size.

4. The apparatus of claim 2 wherein said fixed allocation requester further generates an indication of capability of the first communication station to communicate the packet data at the more-than-full rate.

5. The apparatus of claim 1 wherein the grant detected by said allocation grant detector comprises a fixed allocation indicating a number of time-slots allocated to the first communication station to communicate the packet data.

6. The apparatus of claim 5 wherein said formatter formats the packet data to be communicated within individual ones of the number of time-slots indicated in the grant detected by said allocation grant detector.

7. The apparatus of claim 6 wherein said formatter further formats the packet data formatted to be communicated within the time-slots of the fixed sequence to include an indication of noncompletion of communication of the packet data when additional packets of data remain to be communicated by the first communication station.

8. The apparatus of claim 7 wherein the indication of the noncompletion is inserted to be communicated within each time-slot in which a subsequent time-slot is to include packet data to be communicated by the first communication station to the second communication station.

9. The apparatus of claim 6 wherein said formatter further formats the packet data formatted to be communicated within the time-slots of the fixed sequence to include an indication of at least selection of completion of communication of the packet data.

10. The apparatus of claim 1 wherein the communication system comprises a TDMA (time-division multiple access), cellular communication system, wherever the first communication station comprises a mobile station, and wherein said fixed allocation requester generates a request for communication upon a RPCH (reverse packet channel) for requesting allocation of the fixed sequence of time-slots.

11. The apparatus of claim 10 wherein a begin packet data unit having a bandwidth preference field is defined upon the RPCH (reverse packet channel) and wherein the request for requesting the allocation of the fixed sequence of time-slots comprises a portion of the bandwidth preference field of the begin packet data unit.

12. The apparatus of claim 11 wherein said fixed allocation requester further inserts an indication in the bandwidth preference field of operability of the mobile station to communicate the packet data at a more-than-normal rate.

13. The apparatus of claim 12 wherein the indication inserted by said fixed allocation requester in the bandwidth preference field of the operability of the mobile station indicates operability of the mobile station at a half-duplex triple-full rate.

14. The apparatus of claim 11 wherein the TDMA (time-division multiple access) cellular communication system includes network infrastructure, wherein the second communication station forms a portion of the network infrastructure, and wherein the grant detected by said allocation grant detector is communicated by the network infrastructure to the mobile station upon a FPCH (forward packet channel).

15. The apparatus of claim 14 wherein an arq status packet data unit is defined to be communicated by the network infrastructure to the mobile station, the arq status packet data unit containing a field containing values indicative of a number of time-slots and fixed allocation allocated to the mobile station to communicate the packet data.

16. The apparatus of claim 15 wherein said formatter further formats the packet data formatted to be communicated within the time-slots of the fixed sequence to include a continue packet data unit, the continue packet data unit included to indicate noncompletion of communication of the packet data when additional packets of data remain to be communicated by the mobile station.

17. The apparatus of claim 15 wherein said formatter further formats the packet data formatted to be communicated within the time-slots of the fixed sequence to include an end block to indicate completion of communication of the packet data.

18. The apparatus of claim 14 wherein an arq status packet data unit is defined to be communicated by the network infrastructure to the mobile station, the arq status packet data unit indicating a new fixed allocation subsequent to a previously allotted fixed allocation.

19. In the communication system of claim 1, a further improvement of apparatus for the second communication station, said further apparatus comprising:

a fixed allocation request detector coupled to receive indications of a request generated by said fixed allocation requester of the first communication station for allocation thereto of the fixed sequence of successive time-slots defined upon the communication channel within which to communicate the packet data; and a grantor operable responsive to detection by said fixed allocation request detector of the indications of the request, said grantor for granting allocation of the successive time-slots to the first communication station to communicate the packet data therein, the grant encompassing all of the successive time-slots.

20. The apparatus of claim 19 wherein the communication system comprises a TDMA (time-division multiple access), cellular communication system, wherein the first communication station comprises a mobile station, wherein the second communication station comprises a portion of network infrastructure of the cellular communication system, and wherein the fixed sequence of the successive time-slots of which the request for the allocation thereof is detected by said fixed allocation request detector is defined upon an RPCH (reverse paging channel).

21. A method for facilitating communication of packet data upon time-slots defined upon a communication channel formed to extend between a first communication station and a second communication station, said method comprising:

generating a request, at the first communication station and responsive to detection thereat of an indication of when the packet data is to be communicated to the second communication station, the request for requesting grant, by the second communication station, of allocation of a fixed sequence of successive time-slots to communicate the packet data from the first communication station to the second communication station, the successive time-slots of the fixed sequence defining a transmission rate at which the packets of data are to be communicated upon the communication channel;

detecting, at the first communication station, when the request requested during said operation of generating the request for the allocation of the fixed sequence is granted; and formatting the packet data within the time-slots of the fixed sequence of the successive time-slots detected during said operation of detecting allocated to the first communication station.

* * * * *